(12) United States Patent
Amtmann (10) Patent No.: US 7,574,350 B2
(45) Date of Patent: Aug. 11, 2009

(54) PASSIVE DATA CARRIER WITH SIGNAL EVALUATION MEANS FOR EVALUATING INFORMATION OF A SELF-CLOCKING SIGNAL

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 987 days.

(21) Appl. No.: 10/515,762

(22) PCT Filed: Apr. 25, 2003

(86) PCT No.: PCT/IB03/01843

§ 371 (c)(1),
(2), (4) Date: Nov. 24, 2004

(87) PCT Pub. No.: WO03/100719

PCT Pub. Date: Dec. 4, 2003

(65) Prior Publication Data

US 2005/0243935 A1    Nov. 3, 2005

(30) Foreign Application Priority Data

May 27, 2002   (EP)  .................................. 02100563

(51) Int. Cl.
*G10L 21/00*  (2006.01)
(52) U.S. Cl. ...................... 704/201; 370/485; 375/360; 375/326
(58) Field of Classification Search ................ 704/201; 370/485; 375/360, 326
See application file for complete search history.

(56) References Cited

U.S. PATENT DOCUMENTS

| | | | | |
|---|---|---|---|---|
| 3,815,100 A * | 6/1974 | Winchester et al. | ........... | 341/50 |
| 4,225,939 A * | 9/1980 | Yashiro | ...................... | 713/501 |
| 4,554,673 A * | 11/1985 | Stevens | ...................... | 375/356 |
| 4,608,702 A * | 8/1986 | Hirzel et al. | ................. | 375/360 |
| 4,788,695 A * | 11/1988 | Iverson et al. | ............... | 375/325 |
| 5,426,667 A * | 6/1995 | van Zon | ..................... | 375/219 |
| 5,841,123 A | 11/1998 | Thorigne et al. | | |
| 6,342,844 B1 * | 1/2002 | Rozin | ......................... | 340/933 |
| 2003/0156603 A1 * | 8/2003 | Rakib et al. | ................. | 370/485 |

FOREIGN PATENT DOCUMENTS

EP          1 091 312          4/2001
WO     WO 9957681 A1 *   11/1999

* cited by examiner

*Primary Examiner*—Daniel D Abebe (57) ABSTRACT

A data carrier (2) that is developed for contactless receiving of a signal, wherein the data carrier (2) can be supplied with energy and information by the signal, provides data carrier transmission means (12) for transmitting the signal and signal evaluation means (17), which, with energy input, are developed to evaluate the signal occurring at the data carrier transmission means (12) with regard to information that can be transmitted by the signal, and energy supply means (16), which, using the signal occurring at the data carrier transmission means (12), are developed to supply the signal evaluation means (17) with energy, wherein the signal evaluation means (17) are developed to evaluate a self-clocking signal (S), which self-clocking signal (S) forms the signal that can be fed to the circuit (13).

12 Claims, 3 Drawing Sheets

PASSIVE DATA CARRIER WITH SIGNAL EVALUATION MEANS FOR EVALUATING INFORMATION OF A SELF-CLOCKING SIGNAL

The invention relates to a data carrier that is developed for contactless receiving of a signal, wherein the data carrier can be supplied with energy and information by the signal, with data carrier transmission means for transmitting the signal and with a circuit, which circuit comprises at least one connection to which the transmission means are connected and over which connection the signal can be fed to the circuit, and which circuit comprises the circuit parts listed below, namely:

energy supply means, which, using the signal occurring at the data carrier transmission means, are developed to supply parts of the circuit with energy; and signal evaluation means, which, with energy input from the energy supply means, are developed to evaluate the signal occurring at the data carrier transmission means with regard to information that can be transmitted by the signal.

The invention further relates to a circuit for a data carrier, which comprises transmission means for transmitting a signal, which circuit comprises at least one connection, to which connection the transmission mean can be connected, and over which connection the signal can be fed to the circuit, and which circuit comprises the circuit parts listed below, namely:

energy supply means, which, using the feed signal, are developed to supply parts of the circuit with energy; and signal evaluation means, which, with energy input from the energy supply means, are developed to evaluate the feed signal with regard to information that can be transmitted by the signal.

The invention further relates to a communication device, which is developed for contactless transmission of a signal to a data carrier, wherein energy and information can be supplied by the signal to the data carrier, and which comprises signal generation means that are developed to generate the signal.

Such a data carrier of the type initially mentioned in the first paragraph and such a circuit of the type initially mentioned in the second paragraph and such a communication device of the type initially mentioned in the third paragraph are known from the document WO99/57681.

The known data carrier, which comprises the known circuit and is developed for contactless communication with the known communication device, from which communication device a signal can be transmitted for the purpose of feeding combined energy and information to the data carrier, comprises signal evaluation means, which with input energy are developed to evaluate the signal with regard to information contained in the signal. The signal is formed from a carrier signal, which carrier signal for information transmission purposes comprises a modulation-free state in relation to its amplitude occurring in a fixed time frame to represent a logical zero, or a modulated state to represent a logical one, so that with the two states a time sequence of logical ones and zeros can be represented, which can be generated by the communication device with a predefined bit rate. For evaluating the signal, a clock signal derived from the received signal is first used with a maximum scanning speed corresponding to a maximum possible bit rate, to scan an envelope of the signal, in order to make the information accessible. For the known data carrier, energy supply means are further provided, which are developed to supply the signal evaluation means with energy, by use of the signal.

In the known data carrier, the problem exists that as a result of the scanning a considerable and not negligible energy requirement is caused in the signal evaluation means. This energy requirement must be met by the energy supply means by use of the signal, so that the energy that can be transmitted depends on the respective distance between the communication device and the data carrier. In this context, the scanning with the maximum scanning speed has proved especially problematic, since this has a negative effect on a maximum communication range between the communication device and the data carrier.

It is an object of the invention to eliminate the problems explained above for a data carrier of the type initially mentioned in the first paragraph and for a circuit of the type initially mentioned in the second paragraph and for a communication device of the type initially mentioned in the third paragraph, and to create an improved data carrier and an improved circuit and an improved communication device.

To achieve the object described above, for a data carrier of the type initially described in the first paragraph according to the invention, the signal evaluation means are developed to evaluate a self-clocking signal, which self-clocking signal forms the signal that can be fed to the circuit.

To achieve the object described above, for a circuit of the type initially described in the second paragraph according to the invention, the signal evaluation means are developed to evaluate a self-clocking signal, which self-clocking signal forms the signal that can be fed to the circuit.

To achieve the object described above, for a communication device of the type initially described in the third paragraph according to the invention, the signal generation means are developed to generate a self-clocking signal, which self-clocking signal forms the signal that can be transmitted to the data carrier.

From the provision of the measures according to the invention, it is advantageously achieved that the evaluation of information can be performed without any scanning, so that, compared to the energy requirement arising with scanning, the signal evaluation means obtain a reduced energy requirement, which causes a gain in the maximum communication range, because for example there is no need at all for an energy-absorbing oscillator for scanning. It also yields the advantage that by omitting all measures for deriving a clock signal from the signal for the scanning and all measures for scanning the envelope of the signal and all measures for determining the bit rate of the sequence of logical ones and zeros, the circuit of the data carrier comprises a correspondingly reduced number of circuit parts which are complicated and expensive to implement, thus being more economical and much simpler to realize, and that the signal evaluation means are much more fault-immune in operation and practically always give reliable results, since the evaluation involves no time quantization, which practically always leads to timing problems. There is also the advantage that the data carrier can be used almost universally and without any additional costs in widely varying geographical and/or political regions, in which regions individual regulations apply with regard to a sideband characteristic of a signal spectrum arising from the transmission of the signal, and with regard to an amplitude of the signal.

It should be mentioned that from the document U.S. Pat. No. 4,481,676 a receiver is known, which is developed for evaluating a self-clocking signal, wherein the signal in this case is transmitted with contacts by an optical wave-guide from a transmitter to the receiver. Regulations that must be considered for a contactless transmission thus play no part.

Furthermore, the signal in this case is used only for the transmission of information, and not for combined transmission of information and energy for the purpose of supplying energy to the receiver, so that energy consumption occurring in the receiver for the signal evaluation is not a problem, and a communication range between the transmitter and the receiver is not negatively affected by this energy consumption by the receiver.

In a solution according to the invention, for example, two distinguishable modulated states can directly border on each other and be bordered by an unmodulated state adjoining this combination of modulated states, wherein the order in which the two modulated states occur is used to represent a logical one or a logical zero. It has proved especially advantageous, however, if the features as in claim 2, claim 8 and/or claim 15 are provided. This yields the advantage that it enables a precise differentiation between the at least two modulated states, wherein each modulated state represents exactly one logical state, without any means of determining an order of occurrence of the two modulated states. It furthermore yields the advantage that it enables a simple circuit realization of the signal evaluation means, which simple implementation results in a correspondingly relatively low energy requirement for the signal evaluation means in the operation of the data carrier. It also yields the advantage that the transmission of the information by the signal can be executed at practically any bit rate, without the need to consider timing problems for a change of state between the modulated states, such as would be present when the two modulated states directly followed one another.

In a solution according to the invention, it has also proved advantageous if the features as in claim 3 or claim 9 are provided. This yields the advantage that to evaluate the transmitted signal, the most simple circuit realization of the signal evaluation means can be used, whose functioning assists low energy consumption, since during a time period in which there is no change of state between the unmodulated state and one of the modulated states, there is a minimal power consumption, avoiding any switching states in the signal evaluation means. It also yields the advantage that the data carrier can also be used without problems if the frequency of the carrier wave is assigned to the UHF range, because in this situation in respect of the data carrier's energy requirement it is not practicable to transmit the signal synchronously. It further yields the advantage that for a signal transmission in the HF range and especially for a signal transmission in the UHF range, a considerable gain is achieved in the communication range.

In a solution according to the invention, it has also proved advantageous if the features as in claim 4 or claim 10 are provided. This yields the advantage of ensuring that the evaluation of each of the two modulated states is not influenced by the other, which makes a significant contribution to the validity and lack of ambiguity of the evaluated information.

In a solution according to the invention, it has also proved advantageous if the features as in claim 5 or claim 11 are provided. This yields the advantage that an individual comparison signal can be fed to each of the comparison stages, so that the two modulated states can be individually detected. It also yields the advantage that each comparison signal has a signal value corresponding to the transmitted signal, so that the evaluation of the signal is enabled independently of a distance between the communication device and the data carrier within the communication range.

In a solution according to the invention, it has also proved advantageous if the features as in claim 6 or claim 12 are provided. This yields the advantage that a clock signal can be generated whose frequency corresponds to the respective bit rate, where the clock signal for example can be fed as operating clock to a microcomputer forming part of the circuit, so that the processing speed of the microcomputer and hence also the power consumption of the microcomputer can be influenced or controlled by the respective bit rate alone.

The aspects cited above and further aspects of the invention will become apparent from the embodiments described below, and are explained with reference to these embodiments.

The invention will be further described with reference to examples of embodiments shown in the drawings to which, however, the invention is not restricted.

Figure 1:
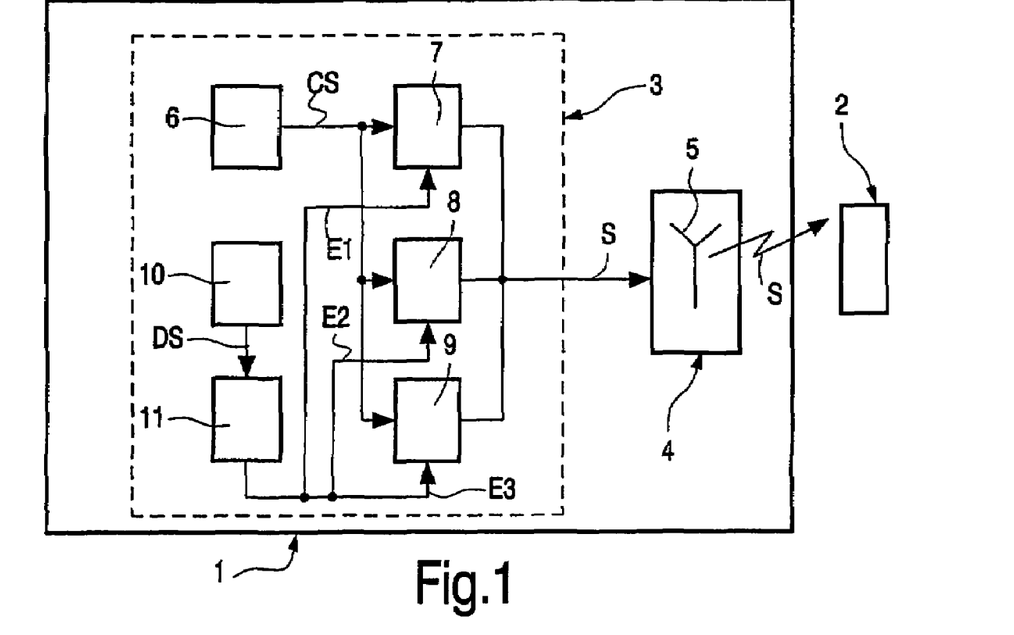
FIG. 1 shows schematically in the form of a block diagram a communication device according to a first embodiment of the invention.

FIG. 1 shows a communication device 1 which is developed for contactless transmission of a self-clocking signal S to a data carrier 2, wherein energy and information can be transmitted to the data carrier 2 with the help of the signal S. For this purpose, the communication device 1 comprises signal generation means 3 and communication device transmission means 4. The signal generation means 3 are developed for generating the signal S and for outputting the signal S to the communication device transmission means 4. The communication device transmission means 4 are realized with the help of a dipole antenna configuration 5, to which dipole antenna configuration 5 the signal S can be fed electrically, and which dipole antenna configuration 5 is developed to emit the signal S in the form of an electromagnetic wave. It should be mentioned that the communication device transmission means 4 comprises, in addition to the dipole antenna configuration 5, an amplifying stage (not shown in FIG. 1) and an adaptation network, but this will be self-evident to the expert.

Figure 2:
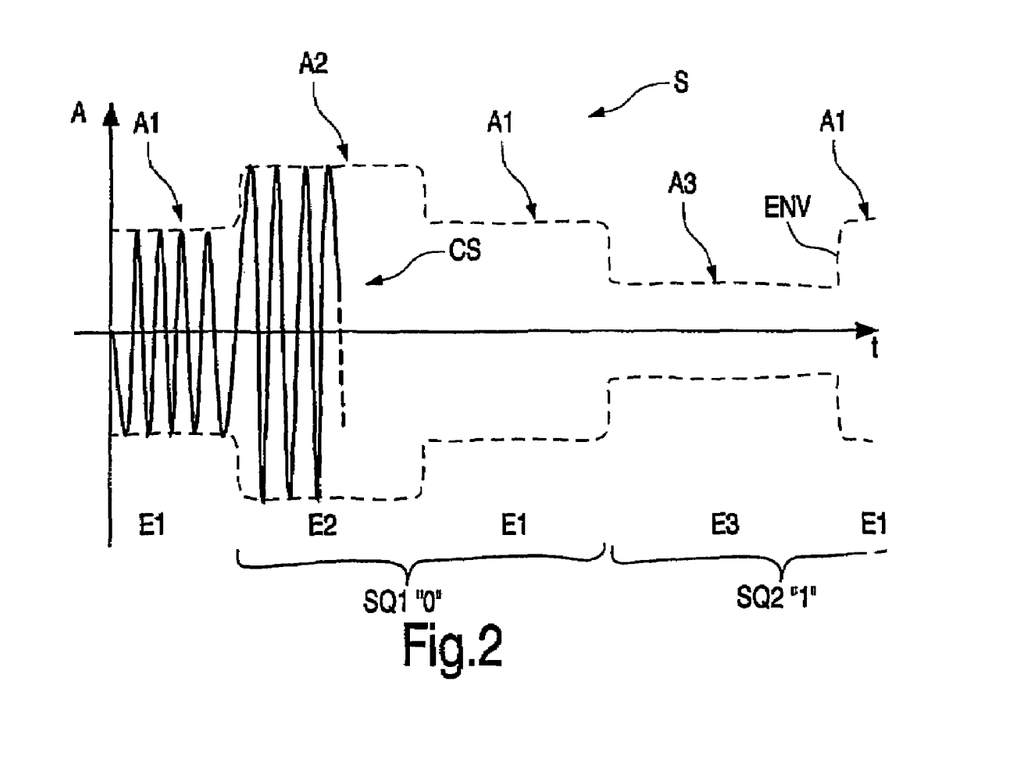
FIG. 2 shows in the form of a diagram a self-clocking signal that can be generated with the help of the communication device.

The self-clocking signal S, which can be generated by signal generation means 3, is shown in FIG. 2 for one time interval. The self-clocking signal S is formed by a carrier signal CS modulated in its amplitude A, which has an oscillating frequency of 2.45 GHz. The self-clocking signal S has a modulation-free state, i.e. an idle state, in which idle state the amplitude A of the carrier signal CS has a first amplitude value A1. The self-clocking signal S further has two modulated states provided for transmitting information and distinguishable from each other in their amplitude values, wherein adjoining modulated states are separated from each other in each case by an idle state. In a first modulated state provided for transmitting information, the amplitude A of the carrier signal CS has a second amplitude value A2, which is greater than the first amplitude value A1. In a second modulated state provided for transmitting information, the amplitude A of the carrier signal CS has a third amplitude value A3, which third amplitude value A3 is smaller than the first amplitude value A1. In FIG. 2 an envelope ENV of the carrier signal CS is also shown, which follows the time of occurrence of the three amplitude values A1, A2 and A3.

For the purpose of generating the self-clocking signal S represented in FIG. 2, the signal generation means 3 of the communication device 1 shown in FIG. 1 comprise a carrier signal generation stage 6, which is developed for generating and emitting the carrier signal CS. The signal generation means 3 further comprise a first amplitude influencing stage 7, which is developed for receiving the carrier signal CS and for influencing the amplitude A of the carrier signal CS, so that the amplitude A has the first amplitude value A1. The first amplitude influencing stage 7 is further developed for receiving a first control signal E1, the first amplitude influencing stage 7 being developed such that during a receipt of the first control signal E1 the carrier signal CS can be emitted with the first amplitude value A1. The signal generation means 3 further comprise a second amplitude influencing stage 8, which is developed for receiving the carrier signal CS and for influencing the amplitude A of the carrier signal CS, so that the amplitude A has the second amplitude value A2. The second amplitude influencing stage 8 is further developed for receiving a second control signal E2, the second amplitude influencing stage 8 being developed such that during a receipt of the second control signal E2 the carrier signal CS can be emitted with the second amplitude value A2. The signal generation means 3 further comprise a third amplitude influencing stage 9, which is developed for receiving the carrier signal CS and for influencing the amplitude A of the carrier signal CS, so that the amplitude A has the third amplitude value A3. The third amplitude influencing stage 9 is further developed for receiving a third control signal E3, the third amplitude influencing stage 9 being developed such that during a receipt of the third control signal E3 the carrier signal CS can be emitted with the third amplitude value A3.

The signal generation means 3 further comprise a data signal source 10, which is developed to emit a data signal DS, which data signal DS represents the information to be transmitted in the form of a sequence of logical ones and zeros. It should be mentioned that the communication device 1 can also be developed to receive the data signal DS from a data signal source arranged externally to the communication device 1.

The signal generation means 3 further comprise a control stage 11, which is developed to receive the data signal DS. The control stage 11 is developed to detect an absence of the data signal DS, as a consequence of which the first control signal E1 is generated by the control stage 11 and can be output to the first amplitude influencing stage 7. The control stage 11 is further developed, in dependence on the logical ones and zeros to be represented, to generate and output a first control signal sequence SQ1 or a second control signal sequence SQ2 when the data signal DS is present. The first control signal sequence SQ1 is reserved for a logical one, and in time sequence shows an occurrence of the second control signal E2 and of the first control signal E1, with the first control signal E1 following the second control signal E2. The second control signal sequence SQ2 is reserved for a logical zero, and in time sequence shows an occurrence of the third control signal E3 and of the first control signal E1, with the first control signal E1 following the third control signal E3. The two control signal sequences SQ1 and SQ2 are entered in FIG. 2 for the purpose of clarifying the time occurrence of the three control signals E1, E2 and E3 and the resulting amplitude A of the carrier signal CS.

Figure 3:
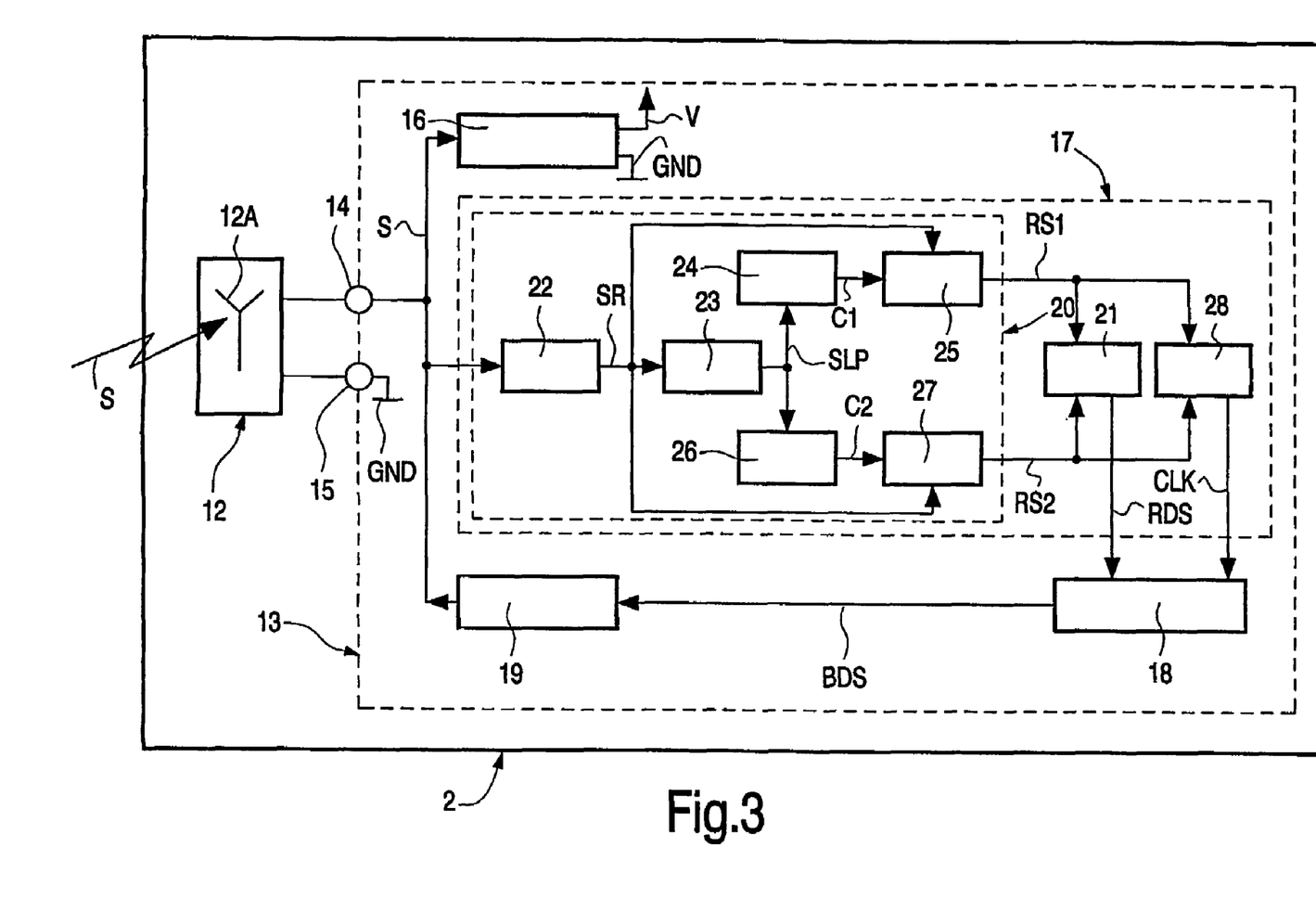
FIG. 3 shows schematically in the form of a block diagram a data carrier according to the first embodiment of the invention.

FIG. 3 represents a data carrier 2, which is developed for contactless receipt of the self-clocking signal S represented in FIG. 2, wherein the data carrier 2 can be supplied with energy and information by the signal S. The data carrier 2 comprises data carrier transmission means 12 for transmitting the signal S. The data carrier transmission means 12 are realized with a dipole antenna configuration 12A. The data carrier 2 further comprises an integrated circuit 13, which circuit 13 comprises a first connection 14 and a second connection 15, to which the transmission means 12 are connected. The second connection 15 is connected to a reference potential GND of the circuit 13. The signal S occurring at the transmission means 12 can be fed to the circuit 13 with the help of the first connection 14.

The circuit 13 is realized with an integrated circuit in CMOS technology, so that the power consumption of the circuit is essentially proportional to a frequency of state changes occurring in the circuit 13 in relation to a time unit. The circuit 13 comprises the circuit parts described below, namely energy supply means 16, signal evaluation means 17, data signal processing means 18, and modulation means 19, means 16, 17, 18 and 19 now being dealt with in detail. It should be mentioned at this point that the data carrier 2 can also have storage means, which can be accessible with the help of the data signal processing means 18.

The energy supply means 16 are realized in a conventional way, and are developed to supply the signal evaluation means 17, the data signal processing means 18 and the modulation means 19 with energy using the signal S occurring at the transmission means 12. For this purpose, an operating voltage V can be generated for the circuit 13 against the reference potential GND with the help of the energy supply means 16, and can be fed to the signal evaluation means 17, the data signal processing means 18 and the modulation means 19.

The signal evaluation means 17 are developed to receive the self-clocking signal S occurring at the transmission means 12, and with energy input from the energy supply means 16 to evaluate the self-clocking signal S in respect of the information transmitted with the help of signal S. The signal evaluation means 17 are developed to generate a received data signal RDS as the result of evaluating the self-clocking signal S and to output the received data signal RDS to the data signal processing means 18, the received data signal RDS representing the data signal DS shown in FIG. 1.

The signal S which can be fed to the first connection 14 of the circuit 13 is, as was explained with reference to FIG. 2, characterized by three states, which differ in respect of the three amplitude values A1, A2 and A3 of the carrier signal CS. The signal evaluation means 17 are developed to evaluate the three states, and for this purpose comprise a demodulation stage 20 and a decoding stage 21.

The demodulation stage 20 is developed to demodulate the signal S and to generate and output a first recognition signal RS1, to which the first modulated state of the self-clocking signal S is assigned, the first recognition signal RS1 being provided to show recognition of the first modulated state. The demodulation stage 20 is further developed to generate and output a second recognition signal RS2, to which the second modulated state of the self-clocking signal S is assigned, the second recognition signal RS2 being provided to show recognition of the second modulated state.

The decoding stage 21 is developed for receiving the first recognition signal RS1 and the second recognition signal RS2. The decoding stage 21 is further developed to use a signal value change in at least one of the recognition signals RS1 and RS2 to decode logical one and zeros that can be transmitted by the self-clocking signal S, and to output a representation of this information in the form of the received data signal RDS. For the purpose of decoding the transmitted signal S, the decoding stage 21 is developed in such a way that the received data signal RDS represents a logical zero if the first recognition signal RS1 changes a signal value for showing the recognized first modulated state of the signal S into a signal value for showing that the first modulated state is not present, while at the same time the second recognition signal RS2 has a signal value to show that the second modulated state is not present. Analogously, for the purpose of decoding the transmitted signal S, the decoding stage 21 is developed in such a way that the received data signal RDS represents a logical one if the second recognition signal RS2 changes a signal value for showing the recognized second modulated state of the signal S into a signal value for showing that the second modulated state is not present, while at the same time the first recognition signal RS1 has a signal value to show that the first modulated state is not present.

For the purpose of generating the two recognition signals RS1 and RS2, the demodulation stage 20 has a rectifier stage 22, which is developed for receiving the transmitted signal S, and for rectifying and smoothing the oscillation in the signal S of the carrier signal CS, and for emitting a rectified and smoothed signal SR representing the signal S. The demodulation stage 20 further comprises a low pass stage 23, which is developed for receiving the rectified signal SR and for low-pass filtering the rectified signal SR and for emitting a low-pass filtered signal SLP, the low-pass filtered signal SLP being practically free of signal value changes which are caused by the two modulated states of the signal S.

The demodulation stage 20 further comprises a first comparison signal generation stage 24, which is developed to use the transmitted signal S in the form of the low-pass filtered signal SLP for generating and emitting a first comparison signal C1, which first comparison signal C1 has a first comparison signal value. This first comparison signal C1 can be generated by an addition of an addition signal derived from the supply voltage V to the low-pass filtered signal SLP. The demodulation stage 20 further comprises a first comparison stage 25, which is assigned to the first modulated state of the self-clocking signal S, and to which comparison stage 25 the first comparison signal generation stage 24 is assigned and which comparison stage 25 is developed to receive the first comparison signal C1 and the rectified signal SR. The first comparison stage 25 is developed to compare the rectified signal SR with the first comparison signal C1 and as a result of the comparison to generate and output the first recognition signal RS1, the first recognition signal RS1 then having the signal value provided for showing the first modulated state of the signal S, if the value of the rectified signal SR exceeds the first comparison signal value of the first comparison signal C1.

The demodulation stage 20 further comprises a second comparison signal generation stage 26, which is developed to use the transmitted signal S in the form of the low-pass filtered signal SLP for generating and emitting a second comparison signal C2, which second comparison signal C2 has a second comparison signal value. The second comparison signal C2 can be generated by a subtraction of a subtraction signal that can be derived from the supply voltage V. The demodulation stage 20 further comprises a second comparison stage 27, which is assigned to the second modulated state of the self-clocking signal S, and to which comparison stage 27 the second comparison signal generation stage 26 is assigned, and which comparison stage 27 is developed to receive the second comparison signal C2 and the rectified signal SR. The second comparison stage 27 is developed to compare the rectified signal SR with the second comparison signal C2 and as a result of the comparison to generate and output the second recognition signal RS2, the second recognition signal RS2 then having the signal value provided for showing the second modulated state of the signal S, if the value of the rectified signal SR falls below the second comparison signal value of the second comparison signal C2.

The signal evaluation means 17 further comprise a clock signal generation stage 28, which is developed to use the two recognition signals RS1 and RS2 to generate and output a clock signal CLK for the data signal processing means 18. The clock signal generation stage 28 is realized in the present case with a logical OR gate, wherein the first recognition signal RS1 can be fed to a first input of this gate, and wherein the second recognition signal RS2 can be fed to a second input of this gate. The output of this gate is connected to a clock signal input of the data signal processing means 18. As a result, the occurrence of a pulse in the first recognition signal RS1 or the occurrence of a pulse in the second recognition signal RS2 causes a pulse in each case in the clock signal CLK. However, it can be mentioned that the clock signal generation stage 28 can also be realized with a multivibrator circuit, which can be developed to output a pulse train, which comprises a predefined number of pulses, as soon as one of the two recognition signals RS1 or RS2 shows recognition of the modulated state assigned to it.

A time-related signal flow of the rectified signal SR and the two recognition signals RS1 and RS2 and the clock signal CLK and a dependence of the signals SR, RS1, RS2 and CLK on the self-clocking signal S is now explained in detail with the help of FIGS. 4a to 4d.

Figure 4A:
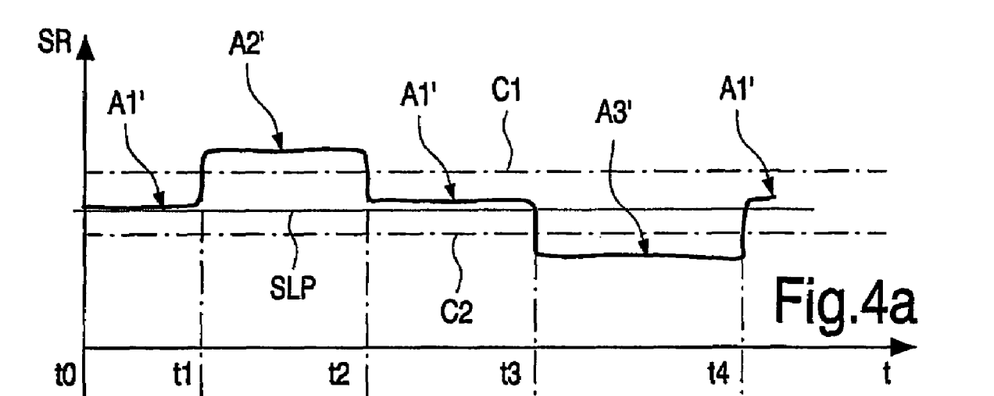
FIG. 4 shows in the form of four diagrams a connectivity between the self-clocking signal according to FIG. 2 and signals occurring within the data carrier according to FIG. 3.

In FIG. 4a the signal SR is shown for the time interval shown in FIG. 2 of the self-clocking signal S, with five points in time t0 to t4 entered in the diagram. The time-related signal flow of the signal SR corresponds to that of the envelope ENV of the self-clocking signal S. In a first signal interval between the times t0 and t1, the signal SR exhibits a first signal value A1', which corresponds to the first amplitude value A1 of the signal S. In a second signal interval between the times t1 and t2, the signal SR exhibits a second signal value A2', which corresponds to the second amplitude value A2 of the signal S. In a third signal interval between the times t2 and t3, the signal SR exhibits the first signal value A1'. In a fourth signal interval between the times t3 and t4, the signal SR exhibits a third signal value A3', which corresponds to the third amplitude value A3 of the signal S. In a fifth signal interval following the time t4, the signal SR exhibits the first signal value A1'.

The first comparison signal C1 is also represented in FIG. 4a in the form of a first broken line, which comparison signal C1 exhibits the first comparison signal value between the first signal value A1' and the second signal value A2'. The second comparison signal C2 is also represented in FIG. 4a in the form of a second broken line, which comparison signal C2 exhibits the second comparison signal value between the first signal value A1' and the third signal value A3'. The first signal value A1' lies between the first comparison signal value and the second comparison signal value. The low-pass filtered signal SLP is also represented in FIG. 4a in the form of a dotted line, whose value essentially corresponds to the first signal value A1' of the rectified signal SR.

Figure 4B:
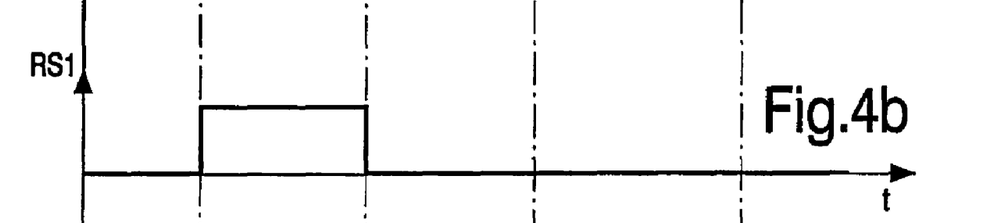

FIG. 4b represents the time-related signal flow of the first recognition signal RS1, wherein the first recognition signal RS1, within the second signal interval of the signal SR, exhibits a pulse, whose impulse signal value is used to display the recognition that the first modulated state of the self-clocking signal S is present. The pulse of the first recognition signal RS1 is surrounded on both sides by an idle state of the first recognition signal RS1, whose idle state signal value is used to show that the first modulated state of the self-clocking signal S is not present.

Figure 4C:
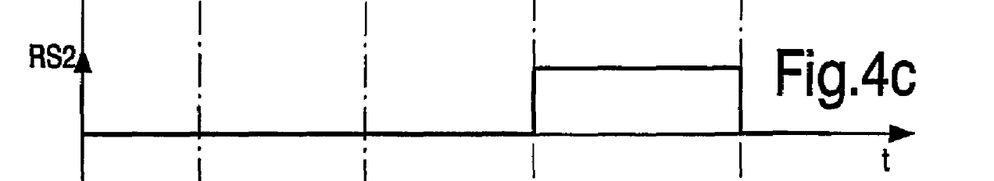

FIG. 4c represents the time-related signal flow of the second recognition signal RS2, wherein the second recognition signal RS2, within the fourth signal interval of the signal SR, exhibits a pulse whose impulse signal value is used to display the recognition that the second modulated state of the self-clocking signal S is present. The pulse of the second recognition signal RS2 is surrounded on both sides by an idle state of the second recognition signal RS2, whose idle state signal value is used to show that the second modulated state of the self-clocking signal S is not present.

Figure 4D:
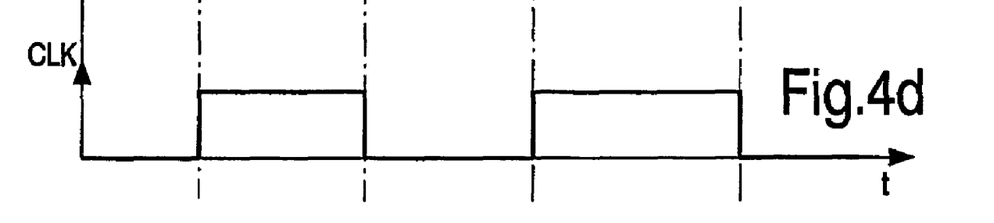

FIG. 4d represents the time-related signal flow of the clock signal CLK, wherein the clock signal CLK exhibits a pulse in each case for an occurrence of a pulse of the first recognition signal RS1 or for an occurrence of a pulse of the second recognition signal RS2.

On the basis of a sample application for the communication device 1 according to FIG. 1 and for the data carrier 2 according to FIG. 3, the function of the device 1 and the data carrier 2 is now explained. According to this sample application, it is assumed that the data carrier 2 is affixed to packaging of a product to identify this product, and is transported together with the product through a communication range of the communication device 1, in order to perform a product identification, in which product identification an item of query information is transmitted from the communication device 1 to the data carrier 2 and as a reaction to the query information a reply information required for identifying the product is communicated from the data carrier 2 to the communication device 1.

In the communication device 1 the carrier signal CS is first generated by the carrier signal generation stage 6, and output to the three amplitude influencing stages 7, 8 and 9. With the help of the data signal source 10 and based on the query information, the data signal DS is generated and output to the control stage 11. The control stage 11 converts the supplied data signal DS into the first control signal sequence SQ1 of the control signals E2 and E1, if the data signal DS represents a logical zero. The control stage 11 converts the supplied data signal DS into the second control signal sequence SQ2 of the control signals E3 and E1, if the data signal DS represents a logical one. The respective control signal sequence SQ1 or SQ2 is output to the three amplitude influencing stages 7, 8 and 9.

The amplitude A of the carrier signal CS is influenced by the three amplitude influencing stages 7, 8 and 9, in dependence on the respectively present control signal sequence SQ1 or SQ2. From the amplitude influencing stage 7, 8 or 9 respectively influencing the amplitude A of the carrier signal CS, a signal section of the self-clocking signal S is output during a signal interval of predefined duration to the communication device transmission means 4, wherein the self-clocking signal S is generated by a succession of signal sections occurring in time sequence and resulting from the individual series of control signal sequences SQ1 and SQ2, which signal S is emitted from the communication device transmission means 4 in the form of an electromagnetic wave.

In the data carrier 2, which is brought into a communication horizon of the communication device 1, the self-clocking signal S occurs at the data carrier transmission means 12, from where the signal S is output to the first connection 14 of the circuit 13 of the data carrier 2. Using the signal S fed over the connection 14 of circuit 13, the energy supply means 16 generate the supply voltage V for the circuit 13 and supply the electric circuit 13 with energy until, when the data carrier 2 is removed from the communication horizon, the field strength of the signal S falls below a minimum value needed for generating the supply voltage V.

The signal S fed to the first connection 14 is further received by the signal evaluation means 17 and evaluated for the query information. The signal S is first fed to the demodulation stage 20, where the high-frequency oscillation of the signal S is rectified and smoothed by the rectifier stage 22, so that the rectified signal SR exhibits the signal values A1', A2' or A3 represented in FIG. 4a. The rectified signal SR is output from the rectifier stage 22 to the low pass stage 23. With the help of the low pass stage 23, the rectified signal SR is low-pass filtered and output as a low-pass filtered signal SLP to the two comparison signal generation stages 24 and 26. The low-pass filtered signal S exhibits the DC component of the rectified signal SR, i.e. essentially the signal value A1'.

With the help of the first comparison signal generation stage 24, the first comparison signal C1 is generated, which exhibits the first comparison signal value, which lies between the second signal value A2' and the first signal value A1', and which signal C1 is output to the first comparison stage 25. With the help of the second comparison signal generation stage 26, the second comparison signal C2 is generated, which exhibits the second comparison signal value, which lies between the third signal value A3' and the first signal value A1', and which signal C2 is output to the second comparison stage 27.

The rectified signal SR is further fed to the first comparison stage 25. With the help of the first comparison stage 25, the rectified signal SR and the first comparison signal C1 are compared to one another and, so long as the signal value A2' is present, the first recognition signal RS1 is generated with the impulse signal value provided to display the recognition of the first modulated state of signal S, leading to the occurrence of the pulse represented in FIG. 4b. The first recognition signal RS1 is output to the decoding stage 21 and to the clock signal generation stage 28.

The rectified signal SR is further fed to the second comparison stage 26. With the help of the second comparison stage 26, the rectified signal SR and the second comparison signal C2 are compared to one another and, so long as the signal value A3' is present, the second recognition signal RS2 is generated with the impulse signal value provided to display the recognition of the second modulated state of signal S, leading to the occurrence of the pulse represented in FIG. 4c. The second recognition signal RS2 is output to the decoding stage 21 and to the clock signal generation stage 28.

Since both comparison signals C1 and C2 are derived from the transmitted signal S, their comparison signal values are dependent on the respective field strength present at the data carrier transmission means 12 for signal S. Furthermore, the rectified signal SR is also derived from the transmitted signal S, so that the comparison signal values of the two comparison signals C1 and C2 and the signal values A1', A2' and A3' to be compared with them are subject to practically the same relative signal value changes caused by position change of the data carrier 2 within the communication horizon. The signal values of the rectified signal SR on the one hand and the signal values of the comparison signals C1 and C2 on the other hand are accordingly always in an actually comparable relation to one another.

In the decoding stage 21, the two recognition signals RS1 and RS2 are decoded according to the time characteristics of their signal values into a time sequence of logical ones and zeros, this sequence forming the received data signal RDS that represents the query information. The clock signal CLK is furthermore generated by the clock signal generation stage 28 using the two recognition signals RS1 and RS2, and output to the data signal processing means 18, with the result that, firstly, the data signal processing means 18 remain in an energy-saving idle state in the absence of the pulses in the recognition signals RS1 and RS2 and only upon an occurrence of the pulses in the recognition signals RS1 and RS2 are pulsed and perform energy-consuming processing steps, and that secondly, in the signal evaluation means 17, no state changes causing power consumption occur, that are not caused by the self-clocking signal itself.

The data signal processing means 18 process the received data signal RDS and generate as a reaction to the query information the send data signal BDS, which represents the reply information. The send data signal BDS is output to the modulation means 19, and communicated to the communication device 1 with the help of the modulation means 19 by a load modulation of the signal S occurring at the transmission means 12.

The provision of the self-clocking signal S for the purpose of information and energy transmission between the communication device 1 according to the invention and the data carrier 2 according to the invention thus gains the advantage that the evaluation of the signal S in the data carrier 2 involves the minimum possible power consumption for circuit 13 of the data carrier 2, so that for a given field strength of the self-clocking signal S a maximum communication range between the data carrier 2 and the communication device 1 can be achieved.

It should be noted that the data carrier transmission means 12 can be realized with the help of a data carrier communication coil and the communication device transmission means with the help of a communication device communication coil, wherein the two communication coils when communicating form an inductive coupling, as is customary for a carrier signal CS, which exhibits an oscillation with a frequency in the high frequency range.

It should also be noted that the carrier signal CS can also have a frequency modulation or a phase modulation, in order to realize the two modulated states for information transmission.

It should also be noted that both the second amplitude value A2 and the third amplitude value A3 can be greater than the first amplitude value A1 or smaller than the first amplitude value A1. It is further mentioned in this context that the amplitude ratios of the amplitude values A1, A2 and A3 to one another can also change during a communication. It is further mentioned at this point that for example in communication device 1 the second amplitude influencing stage 8 can be developed to use the second control signal E2 to change the second amplitude value A2 according to a random or predefined time plan. The same applies analogously to the third amplitude influencing stage 9. Furthermore, it is also possible for more than the three amplitude influencing stages 7, 8 and 9 to be provided in the communication device 1. With the provision of these measures, the advantage is gained that the spectrum of the self-clocking signal S is advantageously adaptable to various regulations, without additional measures being needed for data carrier 2, in order to be able to evaluate the self-clocking signal S for the information and to be able to supply the circuit 13 with energy with the help of signal S.

It should further be noted that for the data carrier 2 the demodulation stage 20 can be developed for generating more than two recognition signals and for this purpose can comprise three or more comparison stages and comparison signal generation stages, and that the decoding stage 21 can be developed in such a case for receiving and processing this number of recognition signals, in order to decode the information contained in the self-clocking signal S.

It can also be provided that during the communication between the communication device 1 and the data carrier 2 the pulse duration of one of the two modulated states or of both modulated states and/or the duration of the unmodulated state between adjoining modulated states can change. This yields the advantage that an occurrence of individual spectral lines is subject to change in time and thus the spectrum of the signal as a whole is blurred over a wide spectral range, resulting in a lower output for the individual spectral lines in the temporal midpoint than with a constant state duration. One and the same data carrier can thus be operated in geographical or political regions that differ from one another with regard to the respectively valid regulations concerning the maximum permitted spectrum output. This is especially advantageous because the frequency with which the modulated states of signal S occur, or the duration for which the individual states of signal S occur, is immaterial for the evaluation of the information transmitted from the communication device 1 to the data carrier 2. With regard to the power consumption of the circuit parts 17, 18 and 19, it is even an advantage if the individual states are present as long as possible, so that as few energy-consuming state changes as possible occur in a time unit in the circuit parts 17 or 18 or 19.

It is also mentioned that instead of the dipole antenna configuration 5 or 12A, a multipole antenna configuration can also be provided.

Furthermore, the first control signal sequence SQ1 can also be formed by the second control signal E2 following the first control signal, and the second control signal sequence can also be formed by the third control signal E3 following the first control signal E1.

The invention claimed is:

1. A data carrier that is developed for contactless receiving of a signal, wherein the data carrier can be supplied with energy and information by the signal,
   with data carrier transmission means for transmitting the signal and with a circuit, which circuit comprises at least one connection to which the transmission means are connected and over which connection the signal can be fed to the circuit, and which circuit comprises the circuit parts listed below, namely:
   energy supply means, which, using the signal occurring at the data carrier transmission means, are developed to supply parts of the circuit with energy; and
   signal evaluation means, which, with energy input from the energy supply means, are developed to evaluate the signal occurring at the data carrier transmission means with regard to information that can be transmitted by the signal, characterized in that the signal evaluation means are developed to evaluate a self-clocking signal, which self-clocking signal forms the signal that can be fed to the circuit;
   characterized in that the signal is formed by a carrier signal that can be modulated in respect of a signal parameter, wherein the signal comprises a modulation-free state and at least two mutually distinguishable modulated states provided for information transmission, and wherein adjoining modulated states are separated from each other in each case by an unmodulated state, and that the signal evaluation means are developed to evaluate the at least three states.

2. A data carrier as claimed in claim 1, characterized in that the signal evaluation means comprise a demodulation stage, which is developed to demodulate the signal and to generate and output at least two recognition signals representing the demodulated signal, wherein to each of the at least two recognition signals a respective one of the modulated states of the signal is assigned and wherein each of the recognition signals is provided to show recognition of the modulated state assigned to it, and that the signal evaluation means comprise a decoding stage, which is developed to receive the at least two recognition signals and using a signal value change of at least one of the recognition signals, to decode the transmitted signal and to output a representation of the information transmitted with the help of the signal.

3. A data carrier as claimed in claim 2, characterized in that the demodulation stage comprises at least two comparison stages for generating the at least two recognition signals, wherein each of the at least two comparison stages is assigned to a respective one of the modulated states, and wherein each of the comparison stages is developed to compare the demodulated signal with a comparison signal assigned to it and corresponding to the respective modulated state.

4. A data carrier n as claimed in claim 3, characterized in that the demodulation stage comprises at least two comparison signal generation stages, wherein each of the last two comparison signal generation stages is assigned to a respective one of the comparison stages and wherein each of the comparison signal generation stages using the transmitted signal, is developed to generate and output the comparison signal to the respective comparison stage to which it is assigned.

5. A data carrier as claimed in claim 2, characterized in that the signal evaluation means comprise a clock signal generation stage, which, using the at least two recognition signals, is developed to generate and output a clock signal for at least one circuit part of the circuit.

6. A circuit for a data carrier, which comprises transmission means for transmitting a signal, which circuit comprises at least one connection to which connection the transmission means can be connected and over which connection the signal can be fed to the circuit, and which circuit comprises the circuit parts listed below, namely:

energy supply means, which, using the feed signal, are developed to supply parts of the circuit with energy; and signal evaluation means, which, with energy input from the energy supply means, are developed to evaluate the feed signal with regard to information that can be transmitted by the signal, characterized in that the signal evaluation means are developed to evaluate a self-clocking signal, which self-clocking signal forms the signal that can be fed to the circuit;

characterized in that the signal is formed by a carrier signal that can be modulated in respect of a signal parameter, wherein the signal comprises a modulation-free state and at least two mutually distinguishable modulated states provided for information transmission, and wherein adjoining modulated states are separated from each other in each case by an unmodulated state, and that the signal evaluation means are developed to evaluate the at least three states.

7. A circuit as claimed in claim 6, characterized in that the signal evaluation means comprise a demodulation stage, which is developed to demodulate the signal and to generate and output at least two recognition signals representing the demodulated signal, wherein to each of the at least two recognition signals a respective one of the modulated states of the signal is assigned and wherein each of the recognition signals is provided to show recognition of the modulated state assigned to it, and that the signal evaluation means comprise a decoding stage, which is developed to receive the at least two recognition signals and, using signal value change of at least one of the recognition signals, to decode the transmitted signal and to output a representation of the information transmitted with the help of the signal.

8. A circuit as claimed in claim 7, characterized in that the demodulation stage comprises at least two comparison stages for generating the at least two recognition signals, wherein each of the at least two comparison stages is assigned to a respective one of the modulated states, and wherein each of the comparison stages is developed to compare the demodulated signal with a comparison signal assigned to it and corresponding to the respective modulated state.

9. A circuit as claimed in claim 8, characterized in that the demodulation stage comprises at least two comparison signal generation stages wherein each of the at least two comparison signal generation stages is assigned to a respective one of the comparison stages and wherein each of the comparison signal generation stages, using the transmitted signal, is developed to generate and output the comparison signal to the respective comparison stage to which it is assigned.

10. A circuit as claimed in claim 7, characterized in that the signal evaluation means comprise a clock signal generation stage, which, using the at least two recognition signals, is developed to generate and output a clock signal for at least one circuit part of the circuit.

11. A circuit as claimed in claim 6, characterized in that the circuit is realized as an integrated circuit.

12. A communication device, which is developed for contactless transmission of a signal to a data carrier, wherein energy and information can be transmitted by the signal to the data carrier, and which comprises signal generation means that are developed to generate the signal, characterized in that the signal generation means are developed to generate a self-clocking signal, which self-clocking signal forms the signal that can be transmitted to the data carrier;

characterized in that the signal generation means are developed to generate a signal formed by a carrier signal that can be modulated in respect of a signal parameter, wherein the signal comprises a modulation-free state and at least two mutually distinguishable modulated states provided for information transmission, and wherein adjoining modulated states are separated from each other in each case by an unmodulated state.

* * * * *